L. & F. G. CAMPBELL.
DETACHABLE PULLEY FOR AUTOMOBILES.
APPLICATION FILED FEB. 9, 1911. RENEWED MAY 24, 1918.
1,288,505.
Patented Dec. 24, 1918.
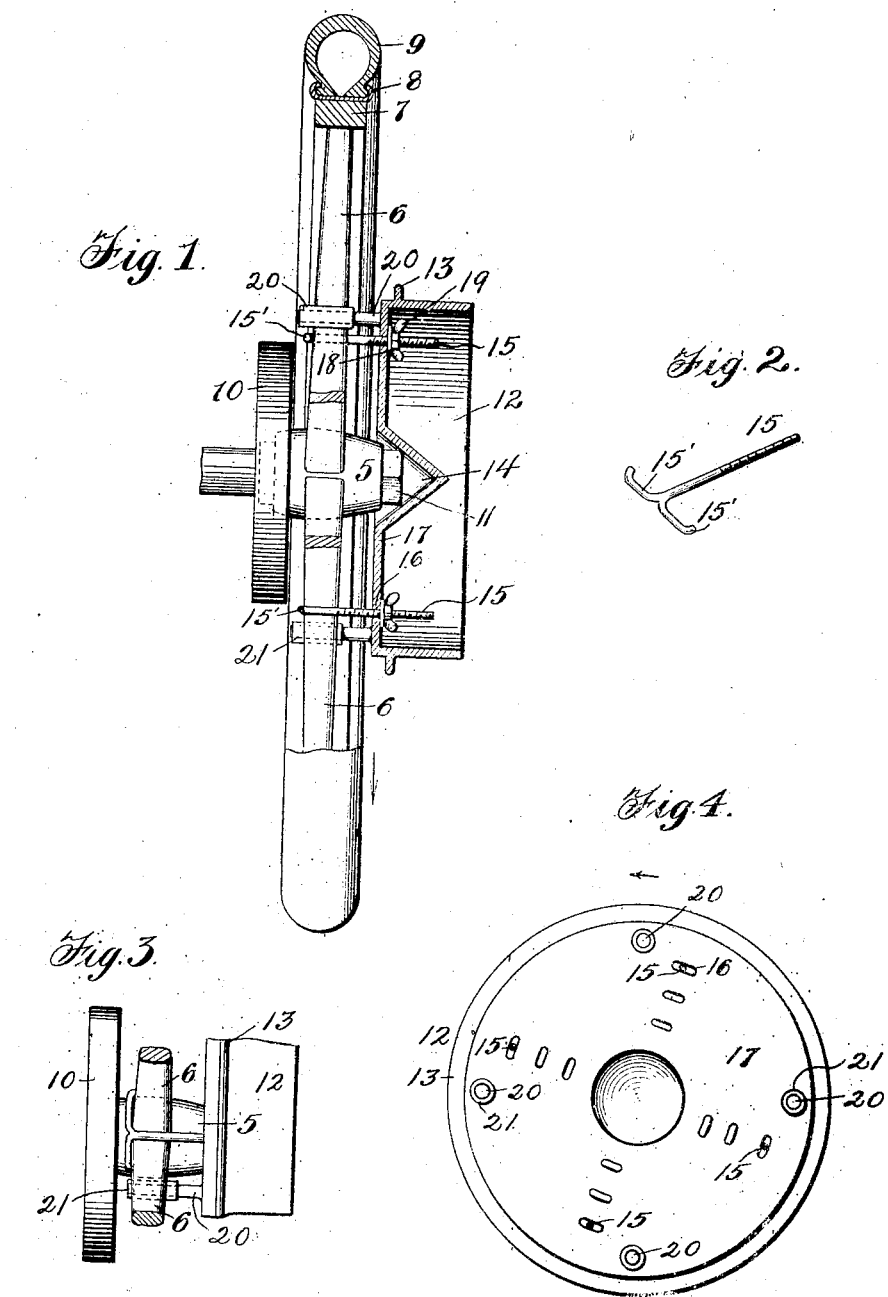

UNITED STATES PATENT OFFICE.

LOUDOUN CAMPBELL AND FRANK G. CAMPBELL, OF WASHINGTON, DISTRICT OF COLUMBIA.

DETACHABLE PULLEY FOR AUTOMOBILES.

1,288,505.   Specification of Letters Patent.   Patented Dec. 24, 1918.

Application filed February 9, 1911, Serial No. 607,695. Renewed May 24, 1918. Serial No. 236,414.

*To all whom it may concern:*

Be it known that we, LOUDOUN CAMPBELL and FRANK G. CAMPBELL, citizens of the United States, residing at Washington, in the District of Columbia, have invented certain new and useful Improvements in Detachable Pulleys for Automobiles, of which the following is a specification.

This invention relates to detachable pulleys for automobiles and has for its object to provide certain improvements in this class of vehicles comprising improved means to render it possible to use the power plant of the automobile to drive other machines than the automobile.

Further objects and advantages of the invention will be set forth in the detailed description which now follows.

In the accompanying drawings,

Figure 1 is a view partly in section of a detachable pulley adapted to be secured to the driving wheel of an automobile.

Fig. 2 is a detail view of a bolt used in securing said pulley in position,

Fig. 3 is a detail view illustrating the manner of engagement of said bolt with the spokes of the wheel, Fig. 4 is a rear face view of the pulley.

Like numerals designate corresponding parts in all of the figures of the drawing. Referring to the drawing, the numeral 5 designates the hub of the driving wheel of the automobile; 6, the spokes; 7, the felly; 8, the usual clencher rim; 9, the tire; 10, the brake drum, and 11, the hub cap. The parts so far described are all of the usual and well known construction.

In carrying out the invention, a cup-like pulley 12 is provided having a peripheral flange 13 and a central conical centering depression 14. T-bolts 15 pass through elongated openings 16 formed in the rear face 17 of the pulley 12, and the arms 15′ of the T-bolts engage behind the spokes 6. Thumb nuts 18 are threaded upon these T-bolts and serve to draw the pulley toward the spokes. At this time, the central depression 14 centers the pulley upon the hub cap and consequently centers it with relation to the wheel. 20 designates ratchet lugs extending from the rear face of the pulley and lying in advance of certain of the spokes, these lugs being covered preferably with short sections of rubber hose 21 to prevent marring of the spokes. It is these ratchet lugs that take the thrust of the spokes and consequently impart the driving movement to the pulley. By virtue of this structure, all transverse strain upon the spokes is avoided. The T-bolts serve only the function of holding the pulley properly centered upon the hub cap. It is apparent that the power plane of an automobile may be used by the owner of said automobile for many purposes such for instance as driving a circular saw, running a feed cutter, pumping water and many other purposes, if means are provided for transmitting power from said power plane to said machines. This pulley provides such means. It may be attached in a few minutes to the driving wheel of the automobile and by lifting said wheel from the ground and starting it to rotate in the usual way, power may be transmitted by a belt (not shown) from the pulley 12 to any other machine.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described our invention what we claim is:

1. In a device of the character described the combination with a wheel having a projecting hub, a detachable pulley comprising a body portion and a central conical portion which converges from a diameter greater than the diameter of said hub to a diameter less than the diameter of said hub, means for drawing said pulley toward said wheel and rigid driving members attached to said pulley and engaging said wheel.

2. In a detachable pulley for automobiles, the combination with a pulley body portion of a central conical centering member, a wheel having spokes and means for drawing said pulley toward the spokes of said wheel.

3. In a detachable pulley for automobiles, the combination with a pulley body portion of a central conical centering member, a wheel having spokes, means for drawing said pulley toward the spokes of said wheel and rigid members projecting from said body portion inwardly between the spokes of the wheel to receive the thrust of said spokes.

4. In a detachable pulley for automobiles, the combination with a wheel having spokes, of a pulley body portion, a centrally located cone for centering said body portion with relation to the hub of the wheel to which said pulley is applied, and means for drawing said body portion toward the spokes of said wheel.

5. In a detachable pulley for automobiles, the combination with a wheel having spokes, of a pulley comprising a body portion having a hollow conical center for centering said body portion with relation to the hub of the wheel to which said pulley is applied, means for drawing said body portion toward the spokes of said wheel and rigid driving members projecting inwardly from said body portion between the spokes of the wheel to receive the thrust thereof.

6. In a detachable pulley for automobiles, the combination with a wheel having spokes, of a body portion having a conical central portion, bolts the heads of which engage the spokes of the wheel, said bolts passing through said body portion, members threaded upon said bolts for forcing said body portion toward the spokes of the wheel and rigid members projecting rearwardly from said body portion and extending between the spokes of the wheel to receive the thrust of said spokes.

7. In a detachable pulley for automobiles, the combination with a wheel of a pulley body portion having a central conical centering portion, T-bolts the heads of which engage behind the spokes of the wheel to which the pulley is applied and the shanks of which pass through said body portion, members threaded upon said shanks upon the outer side of said body portion and rigid driving members projecting from the rear side of said body portion and extending between the spokes of the wheel.

8. In a detachable pulley for automobiles, the combination with a wheel of a pulley body-portion having a central conical centering portion, T-bolts the heads of which engage behind the spokes of the wheel to which the pulley is applied and the shanks of which pass through said body portion, members threaded upon said shanks upon the outer side of said body portion and rigid driving members projecting from the rear side of said body portion and extending between the spokes of the wheel, there being elongated slots formed in said body portion through which said shanks pass.

9. In a detachable pulley for automobiles the combination with a pulley body portion of a central conical centering member.

10. In a device of the character described the combination with a wheel having a hub and spokes, of a detachable pulley, comprising means for centering said pulley upon the hub of the wheel and means for drawing said pulley toward the spokes of the wheel.

11. In a device of the character described, the combination with a wheel having a projecting hub of a detachable pulley comprising a body portion and a central conical portion which converges from a diameter greater than the diameter of said hub to a diameter less than the diameter of said hub and which is of such size with relation to the hub that it will center itself upon the hub before its body portion contacts with the spokes of the wheel and means for drawing said pulley toward said wheel.

In testimony whereof we affix our signatures in presence of two witnesses.

LOUDOUN CAMPBELL.
FRANK G. CAMPBELL.

Witnesses:
J. M. WYNKOOP,
EDWIN S. CLARKSON.